Nov. 26, 1957　　E. G. CLARK ET AL　　2,814,501
VEHICLE TANDEM AXLE SUSPENSION
Filed Jan. 20, 1955　　3 Sheets-Sheet 1

INVENTORS
Edmund G. Clark
Glen D. Holmberg
BY
ATTORNEY

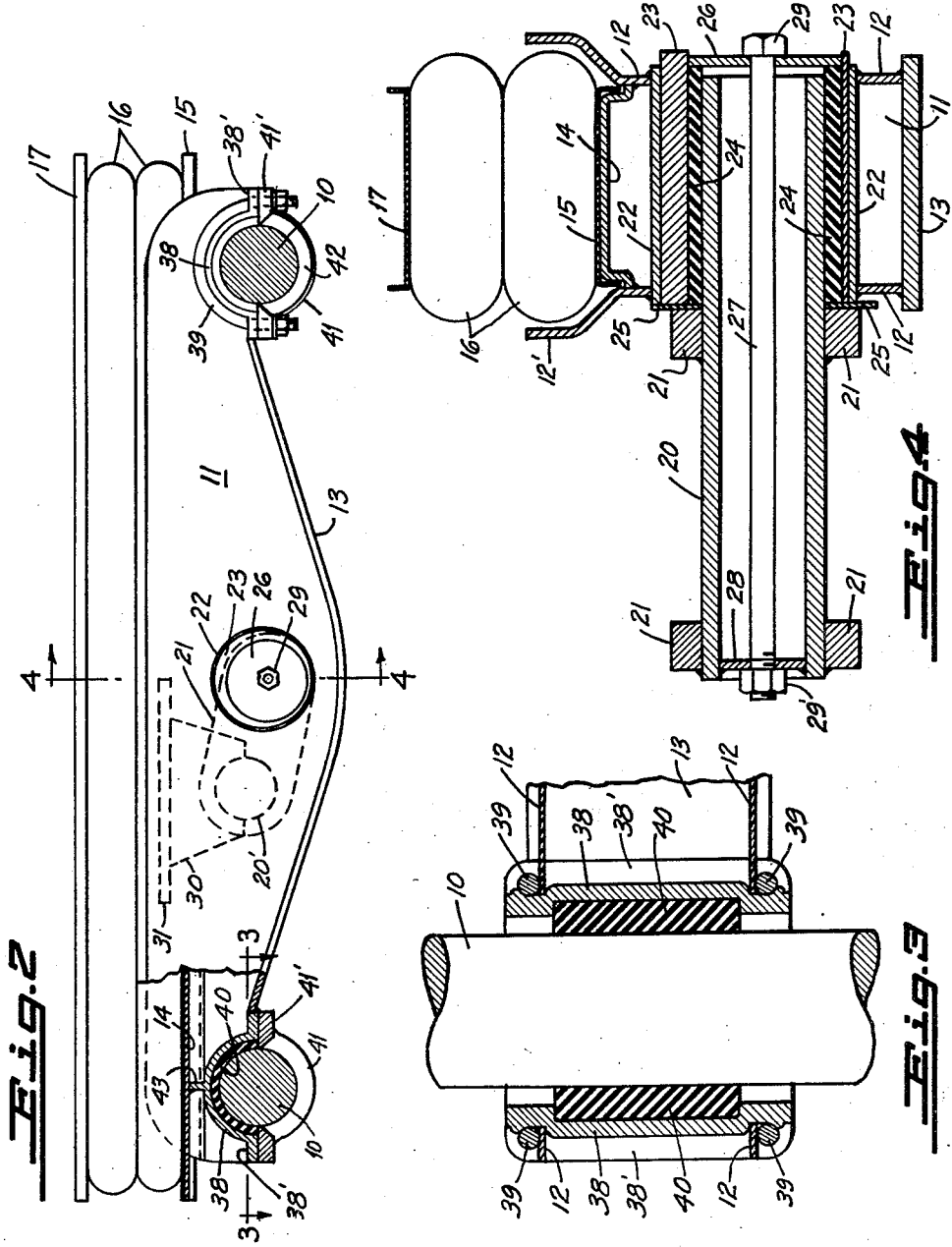

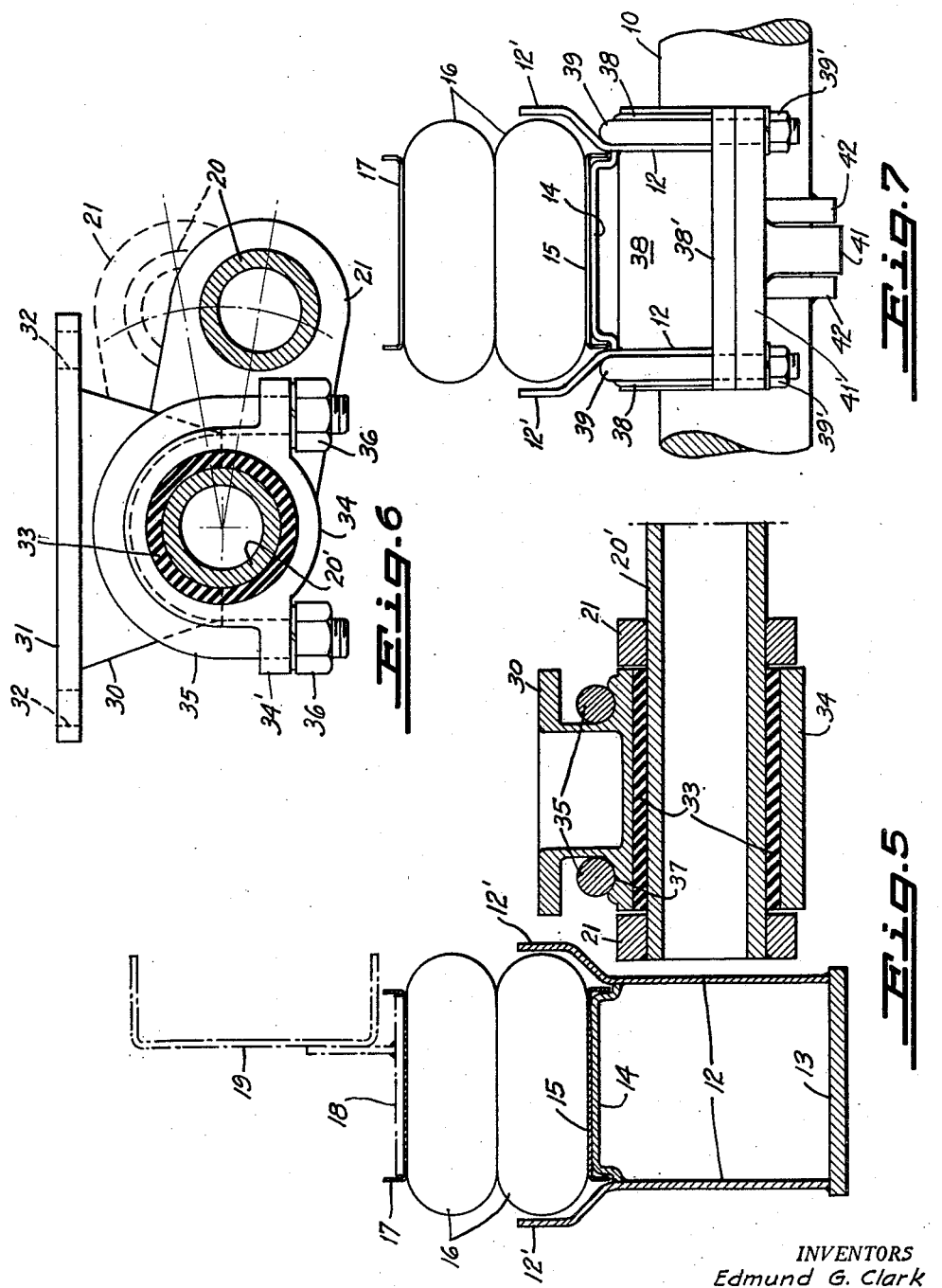

2,814,501
Patented Nov. 26, 1957

2,814,501
VEHICLE TANDEM AXLE SUSPENSION

Edmund G. Clark, Mountain View, and Glen D. Holmberg, San Mateo, Calif., assignors of one-half to Twenty-Five Associates, Inc., a corporation Application January 20, 1955, Serial No. 483,131

17 Claims. (Cl. 280—104.5)

This invention relates to an axle suspension device for use with vehicles equipped with pneumatic bellows type springs, commonly referred to as air springs.

Pneumatic bellows type air springs have to a large degree begun to replace steel leaf springs for mounting the chassis upon an axle unit of the vehicle, particularly in the case of trucks and trailers. In the pneumatic bellows air spring as generally constructed an elongated, bag-like or bellows type structure made of rubber or similar elastic material and inflated with air is positioned longitudinally between the chassis and the axle. A pair of such air bellows is used with each axle unit, one for each side of the chassis, the chassis bearing upon the top of the bellows, with an appropriate plate therebetween, and the bottom side of the bellows in turn bearing upon a plate or other appropriate surface carried by the axle unit. In the case of a single axle truck mounting, as distinguished from multiple axle units, the over-all dimensions of the air bellows are generally in the neighborhood of six to eight inches from top to bottom, about the same dimension from side to side, and about two feet in length. In the case of tandem or multiple axle units, for example, a unit comprised of two axles (four wheels), a single bag or bellows for each side of the chassis per multiple axle unit may cushion the load upon the multiple axle unit, the length of the cushion being increased accordingly. Accompanying these pneumatic bellows, and connected therewith, is a pressure tank, mounted in the vicinity of the bellows, which carries compressed air, and by means of an automatic gauge or valve device in the conduit leading from the air pressure tank to the bellows, the air pressure within each bellows is kept in adjustment for variations in the weight of the load carried by the vehicle and for impacts upon the bellows as the wheels of the vehicle move over irregularities in the road surface or other terrain.

These air bellows are designed primarily to withstand only the vertical force of gravity due to the load on the chassis and the vertical impact forces due to irregularities in road surface. They are not capable of withstanding such other forces as those arising from driving torque and brake torque and the lateral transverse forces that come into play from axle alignment or when the vehicle is going around curves on the highway. Due to driving and brake torque one end of the air bellows is subjected to a compressing or squeezing force and the other end to a stretching or pulling force and the resulting deformation from the normal shape of the bellows would subject them to an undue amount of wear and tear. Equal if not greater wear and tear upon these air bellows would result from the lateral deformation and twisting of the bellows that would arise in going around curves, during which the truck load tends to keep on in a straight line thus tending to set up a transverse movement of the axle unit with respect to the air bellows. With heavily loaded vehicles traveling at highway speed the resulting wear and tear on the air bellows would be severe if the air springs had to take the attending transverse forces.

In the case of tandem or multiple axle units where two axles (four wheels) comprise an axle unit, the problem of preventing these adverse forces from acting upon the air bellows is more complicated than in the case of single axle units, and in general a solution to the problem for single axle units will not apply to a tandem axle unit.

It is a primary object of this invention to provide a suspension device connected between the chassis and a tandem axle unit of a vehicle, which is supplementary to the air springs and which acts to transfer to the chassis frame the brake and driving torque forces, the centrifugal forces arising on road curves and the transverse force arising from alignment of the axle, thereby relieving the air springs from the adverse effects of these forces, while at the same time not interfering with the vertical deflection of the air springs due to variations in load on the chassis or to the vertical impact forces arising from irregularities in road surface or terrain over which the wheels of the vehicle travel.

Our invention comprehends providing, in combination with a tandem axle unit and air springs on each side of the vehicle, a walking beam adapted to support the air springs and mounted at its two ends over the axles of the axle unit to be supported by said axles, a shaft extending across the vehicle and to which the walking beams are pivoted and about which they may oscillate when the wheels of the axle unit are traversing uneven terrain, the said cross shaft being provided with a cranked or offset portion in a direction toward either the front or rear of the vehicle, and pivotally connected to the chassis frame of the vehicle. In the mounting of the ends of the walking beams upon the axles, means are provided which prevent rotational but which permit pivotal movement of the axles with respect to the beams. Brake and driving torque forces are thereby transferred directly into the walking beams and, because of the rigidity of these beams, are not transferred to the air springs. This arrangement also provides that as the axles go out of parallel to each other due to the wheels moving over uneven terrain, the resulting twisting action is prevented from being taken up by the beams. By interposing between our walking beams and the chassis a crank shaft which in turn is pivoted to the chassis, and therefore actuated by the vertical movements of the chassis as the air springs deflate or inflate, we provide, with respect to the chassis, floating walking beams. Through the connections from axles to walking beams and thence through the cross shaft and crank connections to the chassis, the lateral forces resulting from transverse motion of the axles are transferred to the chassis.

The essential features of the invention involved in carrying out the objects indicated are susceptible to modification, but a preferred embodiment of the invention is shown in the accompanying drawings, in which:

Fig. 1 is a top plan view of our device and a top plan view of the axles of a two-axle unit and the two plates (one on each side of the vehicle) on which the air springs (not shown) rest. For simplicity the axle drives are not shown.

Fig. 2 is a side view of the arrangement shown in Fig. 1. The two axles of the multiple axle unit are shown solid and in cross section. This figure also shows a side view of an air-bellows or air spring.

Fig. 3 is an enlarged view on line 3—3 of Fig. 2.

Fig. 4 is an enlarged sectional view on line 4—4 of Fig. 2 from one side of the vehicle.

Fig. 5 is an enlarged sectional view on line 5—5 of Fig. 1. A section of chassis frame above the air bellows being also shown.

Fig. 6 is an enlarged sectional view on line 6—6 of Fig. 1.

Fig. 7 is an end view of one side of the arrangement shown in Fig. 1, the air bellows springs on one side of the vehicle being also shown.

Figure 1:
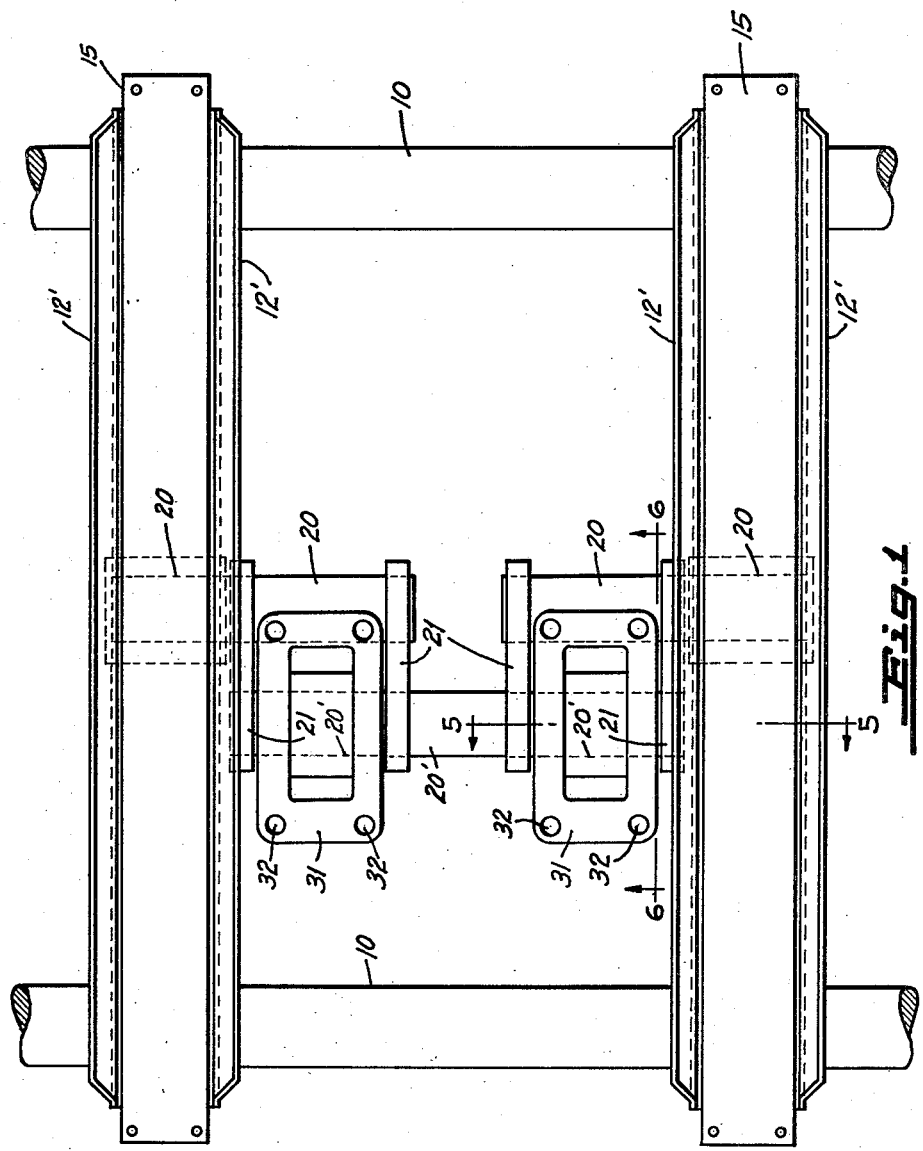

Referring to the drawings, reference numeral 10 designates each of the axles of a multiple axle unit having two axles. These axles may be hollow or solid as desired. Extending from one axle to the other on each side of the vehicle, and mounted on each axle is a box-beam 11 (hereinafter sometimes referred to as a walking beam), made up of two vertical plates 12 (Fig. 5), a bottom plate 13 and a top plate 14, all four said plates being welded together at adjacent edges to form a rigid box-beam structure. As shown in side view in Fig. 2 this beam has a maximum vertical depth midway between the two axles 10 and may, if desired, be of progressively lesser depth toward its two ends at it approaches each axle. This variation in depth of box-beam 11 is with reference to, i. e., measured from, upper plate 14, which is horizontal throughout the length of beam 11. The mounting of box or walking beam 11 to the two axles 10 will be hereinafter explained in detail. Resting upon upper plate 14 of each beam 11 are base plates 15 (shown in section in Fig. 5, in edge view at the ends of the view in Fig. 2 and in plan view in Fig. 1) upon which air bellows 16 rest. Desirably, plates 14 and 15 are so channel shaped in cross-section that they nest together to assist in base plate 15 being held in fixed lateral position with reference to the top surface of box beam 11. An upper plate 17, which may also be channel shaped, rests upon each air bellows and serves as support for chassis frame members 18 and 19 (Figs. 5 and 7). Desirably, though not necessarily, side plates 12 of box-beams 11 may extend upwardly beyond upper plate 14 throughout substantially their entire length to form flanges 12' which serve as fenders for the air bellows springs.

Extending across the vehicle above and over the center line of the two-axle unit is an offset or cranked cross shaft 20 (Fig. 1) which is preferably hollow and which is pivoted at each end in the center of box beam or walking beam 11. The off-set portion 20' of this cross shaft is rigidly secured to the main cross shaft portion 20 by means of crank members 21 which are so positioned that the offset portion 20' is either rearward or forward, as desired, of the main crank shaft portion 20. Desirably, as in the construction shown in Fig. 1, there are four of these crank members 21, each outermost one and its adjacent innermost one serving as a pair to connect an end of the offset portion 20' to the main cross shaft portion 20. The outermost crank members 21 are also positioned so that in their up and down movement about the center line of cross shaft 20 their outer sides are in contact with the inner ends of the mounting structure which connects shaft 20 with beam 11, the details of which mounting, shown in Fig. 4, will now be more fully explained.

As shown in Fig. 4, cross shaft 20 extends through both the inner and outer side plates 12 of walking beam 11, appropriate openings being made in said side plates therefor, the end of said shaft being about flush with the outer surface of outer side plate 12. Fitted in said openings and welded to both inner and outer side plates 12 is a hollow cylindrical member 22 inside of which, and movably fitted with respect thereto, is an eccentric adjusting bushing 23 the eccentricity arising from the fact that its inside cylindrical surface is off center from its outside cylindrical surface, said outside surface being concentric with member 22 and said inside surface concentric with shaft 20. Positioned in the annular space between said eccentric adjusting bushing 23 and cross shaft 20 is a resilient bushing 24 made of hard rubber or other suitable resilient material. The outer ends of bushings 23 and 24 extend beyond the end of shaft 20, the end of bushing 23 extending beyond the end of bushing 24. A floating washer 25 fits around cross shaft 20 against the outer side of crank member 21 and against the inner end of cylindrical member 22 and the inner end of bushings 23 and 24. Floating washer 26 fitted within bushing 23, rests against the outer end of resilient bushing 24 and is fitted around bolt 27 which extends axially through an end portion of cross shaft 20, i. e. from its outer end to the point where the innermost crank member 21 takes off from cross shaft 20. Washer 28 which fits around bolt 27 is welded to the inside of hollow shaft 20. It will thus be seen that by the tightening of nut 29 and/or 29' with which bolt 27 is provided, floating washer 26 will be forced against resilient bushing 24 whereby said bushing, being held against washer 25 which in turn is held against crank member 21, will be squeezed and compressed against shaft 20 and bushing 23. In this mounting there is primarily only rotational movement of the shaft with respect to the beam as the latter oscillates as a walking beam when the wheels of either axle traverse uneven terrain. By the use of the rubber bushing, instead of an all metal bearing, lubrication of the bearing is dispensed with and the rubber acts to absorb shock and dampen the hammering effect transmitted to the mounting as the wheels traverse uneven terrain. The degree of resilience imparted to the rubber bushing to assist it in performing this duty depends to an extent upon the amount it is compressed, which can be varied as desired by adjusting the nuts 29 and/or 29' on bolt 27. The outer side of the exposed end of eccentric adjusting bushing 23 may be provided with milled faces so that a wrench may be applied thereto to turn said eccentric bushing to adjust the alignment of the mounting assembly as for example to correct for any misalignment of axles resulting during factory construction of the vehicle. If desired, in order to assist in the eccentric adjusting bushing 23 being held in position when an alignment adjustment is made, the said bushing 23 may be split longitudinally along its thinnest wall and adapted to have a given space between the adjacent edges whereby when pressure is applied to the resilient bushing 24 through the tightening of nuts 29 and/or 29', resilient material will be squeezed through the opening provided by the split and against cylindrical member 22. Obviously, other means may be had for holding the adjusting bushing in desired positions.

The offset portion 20' of cross shaft 20 is pivotally mounted to the chassis frame through vertical brackets 30 (side view thereof shown in Figs. 2 and 6), which are welded to horizontal plates 31 (Fig. 1), which in turn are bolted to chassis frame members, not shown, holes 32 being provided in plates 31 for thus securing said plates to the chassis. As shown in the sectional view of Fig. 5 (taken on line 5—5 of Fig. 1) and Fig. 6 (taken on line 6—6 of Fig. 1), the underneath side of bracket 30 is semi-cylindrical in shape and is thereby adapted to fit over the upper half of resilient bushing 33 (made of hard rubber or other suitably resilient material) which is fitted around a section of the offset portion 20' of cross shaft 20. Fitted against the lower half of resilient bushing 33 and therefore provided with a semi-cylindrical surface to adapt it therefor, is member 34 provided with a projecting section 34' on each side thereof which is drilled with appropriate holes through which pass the ends of U-bolts 35 provided with nuts 36. The brackets 30 are provided on each side with a suitable saddle 37 (Fig. 5) to carry the said U-bolts. The semi-cylindrical portions of brackets 30 and members 34 are adapted to have some space or clearance between their adjacent edges when they are fitted in position around resilient bushings 33 and before nuts 36 are tightened on U-bolts 35, so that the desired amount of compression will be imparted to resilient bushings 33 upon the tightening of said nuts to bring said adjacent edges together. Resilient bushings 33 function similarly to resilient bushings 24 in the mounting which connects shaft 20 to beams 11.

The details of the pivotal mounting of walking beams 11 upon axles 10 will be seen from the side and sectional views of Fig. 2, the sectional view of Fig. 3 (taken on line 3—3 of Fig. 2) and the end view (of one side of the vehicle) shown in Fig. 7. To accommodate the position of the wheels of the vehicle being located on the outer sides of walking beams 11, axle 10 must extend through the entire width of said walking beams, necessary portions of each of the two side plates 12 and bottom plate 13 of each walking beam being cut away to permit this. Cap member 38, which is generally semi-cylindrical in shape and having its lower side provided with a semi-cylindrical surface adapted to be positioned over, but not in contact with, axle 10, is welded to both inner and outer side plates 12 of walking beam 11, each longitudinal edge of said cap member 38 being provided with a shelf 38' extending horizontally outward therefrom a sufficient distance that holes drilled therein may receive the ends of U-bolts 39 resting in suitable saddles formed in the outer or upper surface of said cap member 38 (Fig. 7). Semi-cylindrical resilient bushing 40 occupies the space between cap member 38 and the upper half of axle 10. Yoke 41 is positioned around the lower part of axle 10 opposite cap member 38. It is a narrow semi-ringlike band provided with a shelf-like projection 41' at each end of its semi-ringlike portion, said shelves being adapted to mate with the two horizontal shelves 38' of cap member 38 and being drilled with holes likewise to receive U-bolts 39. The said shelves 41' of yoke 41 are substantially the same length as corresponding shelves 38' of cap member 38 and are of sufficient width that their inner edges are in contact with axle 10. Thus shelves 41' are positioned so that they contact the two longitudinal edges of semi-cylindrical hard rubber bushing 40. The distance, circumferentially, from edge to edge of hard rubber bushing 40, in comparison with that of cap member 38, is such that when cap member 38 is in position upon said rubber bushing and yoke 41 is in position about axle 10 with its shelves contacting said rubber bushing, but before nuts 39' are tightened on U-bolts 39, there is sufficient clearance between the adjacent faces of shelves 38' and 41' that when the nuts are tightened on said U-bolts to bring the adjacent faces of said shelves together the rubber bushing will have been compressed to a density commensurate with the resiliency desired to be imparted to said rubber bushing. When the two axles of the axle unit get out of parallel to each other when the wheels move over uneven terrain the rubber bushings are subjected to compression forces which would otherwise tend to twist or sever the axles from the walking beams 11. In taking the deformation and twisting stresses arising in this last mentioned action, our mounting assembly is particularly advantageous. By the use of the narrow semi-ring portion of yoke 41 it will be noted that as the axles get out of parallel alignment with each other due to certain of the wheels traversing high or low ground as compared to other wheels of the same axle unit, the axles pivot or rock about said narrow yoke ring. Thus with our half-cylindrical bushing and the narrow yoke serving as a fulcrum over which the axle may pivot, we obtain a mounting better adapted to take the twisting action when the axles go out of parallel over uneven terrain. Positioned on each side of the semi-ring portion of yoke 41, and welded to axle 10, are two block members 42 which extend circumferentially around the lower part of axle 10 from the projecting shelf member 41' on one side of the axle to the projecting shelf member 41' on the other side of the axle. Since these block members 42 are welded to and, in effect, are integral with the axles 10, since they contact shelves 41' which in turn contact shelves 38' (when the nuts 39' are tightened on U-bolts 39), and since shelves 38' are integral with cap member 38 which is welded to the side plates of beam 11, it will be seen that the torque forces created by the tendency of axles 10 to rotate during braking and driving are transferred directly to walking beams 11 and that the air-springs are thereby protected from these forces. Block members 42, by being adjacent to yoke 41, also serve to prevent lateral movement of axle 10 with reference to beam 11. If desired, this prevention of lateral movement may be accomplished by the use of a single block member adjacent yoke 41 and on either side thereof if mated by a block member similarly positioned on the other end of the axle.

As will be noted, the walking beams 11 in our suspension system are not directly connected to the chassis, i. e. that they do not pivot or oscillate about an axis located in a member rigidly fixed to the chassis. Interposed between the axes of oscillation of our walking beam and the chassis is a crank and it is this crank that oscillates on an axis fixedly positioned with reference to the chassis. The crank is actuated by the vertical movement of the chassis with reference to the walking beams, or in other words, as the vertical distance between chassis and the beams changes due to the air-springs deflating or inflating as the vertical forces on the air-springs change. Thus it may be said that we employ floating walking beams. This change in position of cross shaft 20, (and therefore of the walking beams which oscillate on said cross shaft) with respect to the chassis is shown in Fig. 6 by the dotted lines for shaft 20 and crank member 21 as compared with the full lines for these members, plate 31 in Fig. 6 being fixed to said chassis.

With lateral movement of axles 10 with reference to walking beams 11 provided against, as hereinabove explained, for the mounting assembly connecting the axles to the beams, with crank members 21 operating adjacent the mounting assembly which connects cross shaft 20 to said beams, as seen in Fig. 4, and similarly for crank members 21 with respect to the mounting assembly connecting the cranked or off-set portions 20' of shaft 20 to chassis brackets 30, as seen in Fig. 5, our suspension system operates to protect the air-springs from lateral stresses that arise from tendencies toward transverse movement of axles with reference to chassis, such, for example, as arise in rounding curves on the highway, in which situation the loaded chassis "keeps up with the axle unit" and does not inflict wear and tear upon the air-springs.

In the box-beam structure of our walking beams we provide an air-tight compartment which serves as the compressed air tank in the air pressure system adapted to automatically adjust the air pressure in the air springs for variations in load and impact thereon. To this end a closure member 43 (Fig. 2) is fitted transversely across each end of beam 11 in the space between side plates 12 and top plate 14 of said beams and semi-cylindrical cap member 38 and is welded thereto along all four of its edges. With cap plates 38 being welded to both side plates of beam 11, and with cylindrical member 22 (of the mounting assembly connecting shaft 20 to beams 11) also being welded to said side plates of said beams as hereinbefore explained, this makes of the box-beam structure of each of beams 11 an air-tight compartment. Appropriate conduits, not shown, connect said compartments with the automatic valves and other appurtenances of the air pressure system.

We claim:

1. In an axle suspension system of a vehicle equipped with a tandem axle unit and an air spring positioned on each side of said vehicle between said axle unit and the chassis of said vehicle to carry the loaded chassis, a walking beam on each side of said vehicle adapted to support said air spring and to oscillate about a horizontal axis which is movable vertically with reference to said chassis, mounting means for connecting said beam at its two ends to the axles of said axle unit, said mounting means being adapted to resist rotational movement of said axles with respect to said beam while permitting pivotal movement of said axles with respect to said beam, a cranked shaft positioned tranversely to said vehicle and extending from one to the other of said beam, a cranked shaft positioned transversely to said of said beams at a point intermediate the mountings of said axles to said beams, and means for pivotally connecting the crank members of said cranked shaft to said chassis.

2. An axle suspension system in accordance with claim 1, in which said mounting means for connecting said beam to said axle comprises a cap member rigidly secured to said beam aand positioned over and out of contact with a portion of said axle, a resilient member positioned between said cap member and the adjacent part of said axle, means for holding said resilient member in compression between said axle and said cap member and for permitting pivotal movement of said axle with respect to said beam whereby said resilient member takes deformation produced by said pivotal movement, and means in association with said mounting means to prevent said axle from rotating with respect to said beam.

3. An axle suspension system, in accordance with claim 2, in which said resilient member is a semi-cylindrical bushing and the means for holding said bushing in compression between said axle and said cap member comprises a yoke fitted around a portion of said axle and opposing said cap member and means for holding said yoke against said cap member.

4. An axle suspension system, in accordance with claim 1, in which said mounting means for connecting said beam to said axle comprises a semi-cylindrical resilient bushing in contact with said axle, a cap member in contact with the outer surface of said bushing and rigidly secured to said beam, a yoke fitted around part of said axle not in contact with said bushing to oppose said cap member, means for holding said yoke against said cap member to put said bushing under compression force, and means secured to said axle and associated with said mounting means to maintain said axle free from transverse and rotational movement with respect to said beam.

5. An axle suspension system, in accordance with claim 1, in which the connecting means for pivotally connecting said cranked shaft to said beams is characterized by having positioned between said shaft and a member secured to said beam a resilient bushing, and means for compressing said bushing against said shaft and said last named member.

6. An axle suspension system, in accordance with claim 1, in which said cranked shaft is characterized by having an off-set portion parallel to the main part of said shaft and rigidly secured to said main part by said crank members, and in which the means for pivotally connecting the crank members of said crank shaft to said chassis is characterized by having positioned about said offset portion a resilient bushing and means for compressing said bushing against said offset portion and said chassis member in which said offset portion turns.

7. An axle suspension system, in accordance with claim 1, in which one of the connecting means for pivotally connecting said shaft to said beam contains a bushing with inner and outer cylindrical surfaces eccentric to each other, one of which surfaces is concentric to said shaft and the other is concentric to a cylindrical member rigidly secured to said beam, said bushing being adapted to be rotated with respect to said cylindrical member to adjust the alignment of said shaft.

8. An axle suspension system, in accordance with claim 1, in which the connecting means for pivotally connecting said shaft to said beams comprises a hollow cylindrical member rigidly secured to said beam, a resilient bushing fitted around said shaft and positioned within but out of contact with said cylindrical member, an adjusting bushing fitted around said resilient bushing and adjacent said cylindrical member, said adjusting bushing having its outer and inner surfaces eccentric to each other with one of said surfaces concentric to said shaft and the other concentric to said cylindrical member, said adjusting bushing being adapted to be rotated with respect to said cylindrical member to align said shaft, means for maintaining said adjusting bushing in an adjusted alignment position, and means for holding said resilient bushing in compression against said shaft and said adjusting bushing.

9. In an axle suspension system of a vehicle equipped with a tandem axle unit and an air spring positioned on each side of said vehicle between said axle unit and the chassis of said vehicle to carry the said chassis, a beam on each side of said vehicle adapted to carry said air spring, each said beam being mounted at one end to one of the axles of said axle unit and at its other end to the other of said axles, a cranked shaft extending across said vehicle from one to the other of said beams and pivotally mounted at its ends to the mid portion of each of said beams, said cranked shaft being characterized by having an offset portion parallel to the main part of said shaft and rigidly secured to said main part by crank members, and said offset portion of said cranked shaft being pivotally connected to said chassis.

10. An axle suspension system in accordance with claim 9 in which the means by which the ends of said beams are mounted to said axles comprises a cap member rigidly secured to said beam and positioned over and out of contact with a portion of said axle, a resilient member positioned between said cap member and the adjacent part of said axle, means for holding said resilient member in compression against said axle and said cap member and for permitting pivotal movement of said axle with respect to said beam, said pivotal movement being accompanied by deformation of said resilient member.

11. An axle suspension system in accordance with claim 9 in which the means by which the ends of said beams are mounted to said axles comprises a cap member rigidly secured to said beam and having a concave arched surface spaced apart from a portion of said axle, a resilient member positioned between said cap member and the adjacent part of said axle, a yoke having an arcuate part fitted around another portion of said axle and having edges adapted to mate and oppose the edges of said cap member, and means to force the mating edges of said yoke and said cap member toward each other to compress said resilient member against said axle and cap member, the arcuate part of said yoke being narrow to permit the pivoting of said axle about said arcuate part, said pivoting being accompanied by deformation of said resilient member.

12. An axle suspension system in accordance with claim 9 in which the means for pivotally mounting an end of said cranked shaft to the said beam is characterized by a receiving member secured to said beam to receive the end of said shaft, a resilient member positioned between said shaft and said receiving member, and means for compressing said resilient member against said shaft and said receiving member.

13. An axle suspension system in accordance with claim 9 in which the means for pivotally mounting an end of said cranked shaft to the said beam is characterized by a receiving member secured to said beam to receive the end of said shaft and having an inner cylindrical surface, an adjusting bushing having an outer cylindrical surface and positioned around said shaft adjacent said receiving member, said bushing having its inner cylindrical surface eccentric to its outer surface and said bushing being adapted to be rotated with reference to said receiving member to adjust the alignment of said shaft.

14. An axle suspension system in accordance with claim 9 in which the means for pivotally mounting an end of said cranked shaft to the said beam is characterized by a receiving member secured to said beam to receive the end of said shaft and having an inner cylindrical surface, a resilient bushing positioned around said shaft, an adjusting bushing having an outer cylindrical surface and positioned around said resilient bushing adjacent said receiving member, said adjusting bushing having its inner cylindrical surface eccentric to its outer surface, said adjusting bushing being adapted to be rotated with reference to said receiving member to adjust the alignment of said shaft, means for holding said adjusting bushing in a position of said alignment, and means for compressing said resilient bushing against said shaft and said adjusting bushing.

15. An axial suspension system in accordance with claim 9 in which the means by which the offset portion of said cranked shaft is pivotally connected to said chassis is characterized by having positioned between said offset portion and the chassis member in which said offset portion turns a resilient bushing and means for compressing said bushing against said offset portion and said chassis member.

16. An axle suspension system in accordance with claim 9 in which said beams are made up of top, bottom and side plates rigidly secured together at their adjacent edges to form a box beam structure, the adjacent plates of at least one of said beams being joined by welded air-tight seams, an air-tight closure at each end of said box beam, and the structures comprising the mountings of said beam to said axles and said cranked shaft to said beams forming air-tight closures where said axles and said shaft join said beam, whereby said box beam structure may serve as a compressed air tank in an air pressure system for supplying air to said air springs.

17. An axle suspension system in accordance with claim 9 in which, in association with at least one of the mounting means by which an end of said beam is connected to an axle of said axle unit there is means secured to said axle to coact with said mounting means to maintain said axle free from transverse and rotational movement with respect to said beam.

References Cited in the file of this patent

UNITED STATES PATENTS

| | | |
|---|---|---|
| 2,493,025 | Pointer | Dec. 3, 1945 |
| 2,663,570 | Hickman | Dec. 7, 1953 |
| 2,742,301 | Pointer | Apr. 17, 1956 |

OTHER REFERENCES

S. A. E. Journal, July 1954 Air Spring Suspensions, pp. 40, 45, 46.